(12) United States Patent
Lindermeir

(10) Patent No.: US 6,634,105 B2
(45) Date of Patent: Oct. 21, 2003

(54) SHEARS, PARTICULARLY HAND-HELD GARDEN OR PRUNING SHEARS OR SECATEURS

(75) Inventor: Wolfgang Lindermeir, Untermarchtal (DE)

(73) Assignee: GARDENA Manufacturing GmbH (DE)

( * ) Notice: Subject to any disclaimer, the term of this patent is extended or adjusted under 35 U.S.C. 154(b) by 40 days.

(21) Appl. No.: 09/872,961

(22) Filed: Jun. 1, 2001

(65) Prior Publication Data

US 2002/0017025 A1 Feb. 14, 2002

(30) Foreign Application Priority Data

Jun. 3, 2000 (DE) .......................................... 100 27 648

(51) Int. Cl.$^7$ ............................................... B26B 13/00
(52) U.S. Cl. ........................................... 30/135; 30/134
(58) Field of Search ........................... 30/244, 134, 135

(56) References Cited

U.S. PATENT DOCUMENTS

| 1,151,874 A | 8/1915 | Harris |
| 1,458,878 A | 6/1923 | Dexter |
| 2,775,032 A | 12/1956 | Sorensen |
| 4,809,433 A | 3/1989 | Maxwell et al. |
| 5,226,236 A | 7/1993 | Harrington, III |
| 5,471,745 A | * 12/1995 | Wendell ................... 30/134 X |
| 5,809,654 A | 9/1998 | Huang |
| 6,308,421 B1 | * 10/2001 | Wang ........................... 30/178 |
| 2002/0020067 A1 | * 2/2002 | Silver et al. .................. 30/226 |

FOREIGN PATENT DOCUMENTS

| DE | 1 693 636 | 2/1955 |
| DE | G 79 26 536.4 | 7/1981 |
| DE | G 81 11 164.9 | 12/1981 |
| DE | 43 02 136 | 9/1993 |
| WO | WO 99/27767 | 6/1999 |

* cited by examiner

Primary Examiner—Douglas D. Watts
(74) Attorney, Agent, or Firm—Akerman Senterfitt

(57) ABSTRACT

Shears (1) preferably constructed as hand-held garden or pruning shears or secateurs has two shear elements (8, 9) pivotable against one another about a pivot axis (5) and which have engaging portions (15, 16) for mutual cutting engagement and which in the opened state of the shears form a shear mouth widening from the pivot axis becoming smaller on closing the shears. According to the invention rubber-like holding means (20) are provided for retaining cutting material introduced into the shear opening during the cutting process and which only act up to the completion of the cutting process, i.e. until the cutting material is cut through, so that the cut cutting material is released by the shears without it being necessary to open the latter again for this purpose.

10 Claims, 3 Drawing Sheets

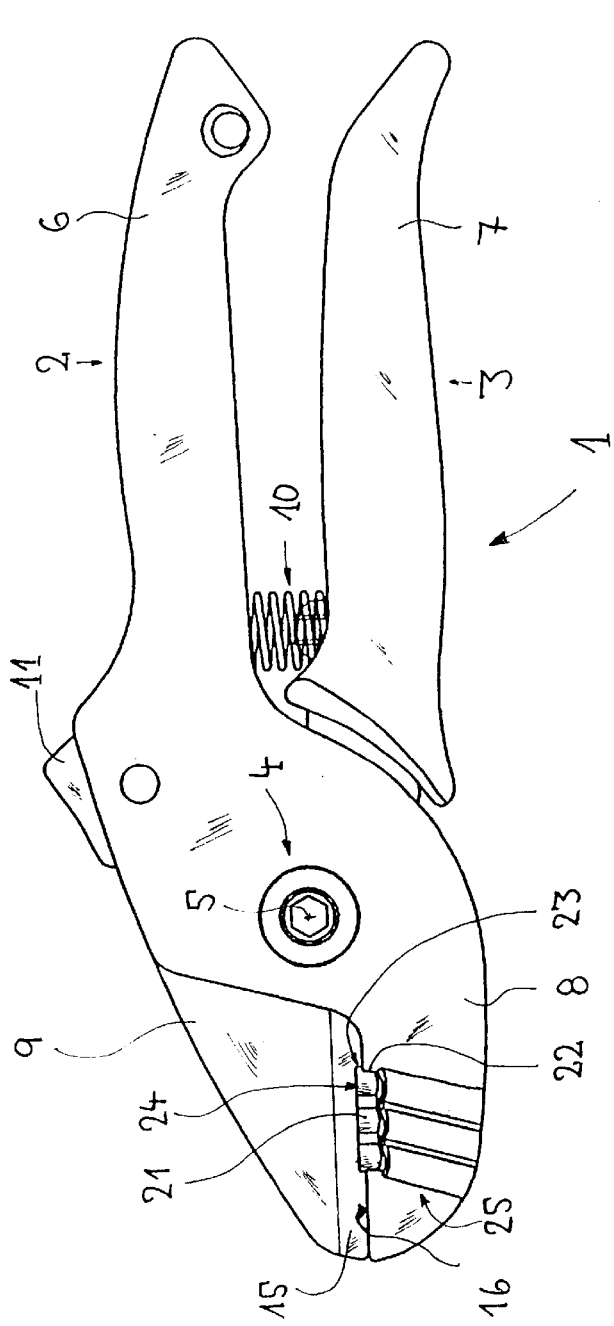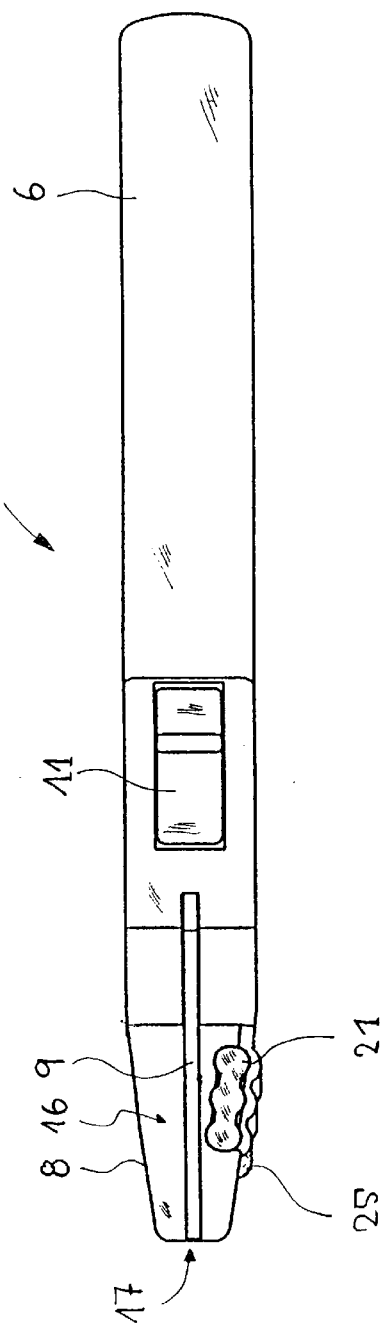

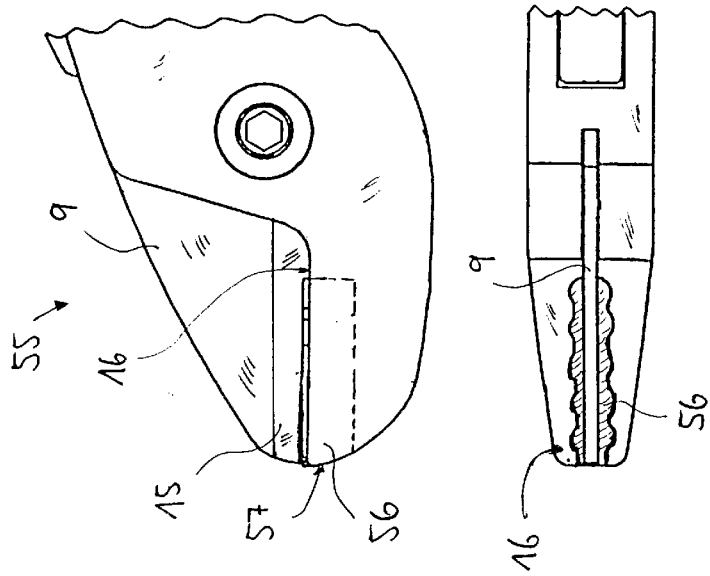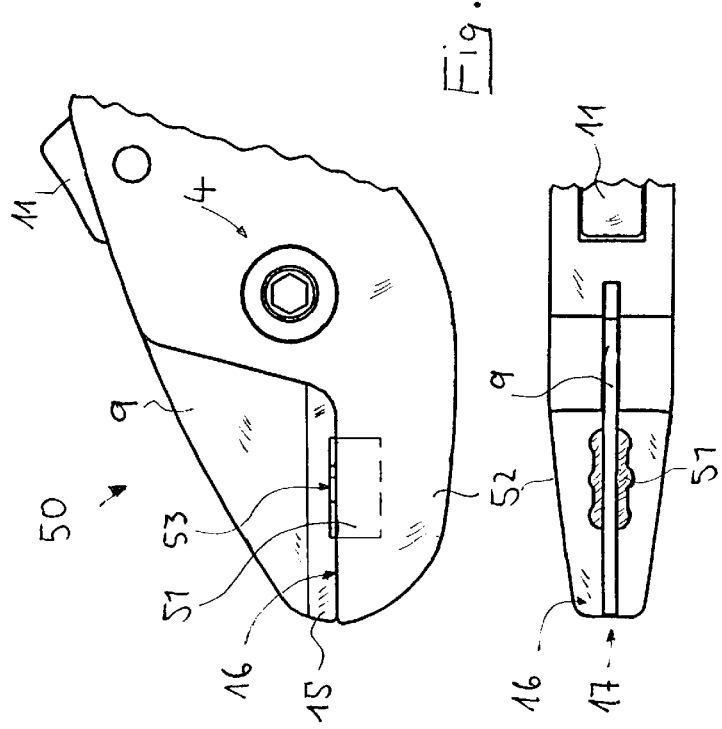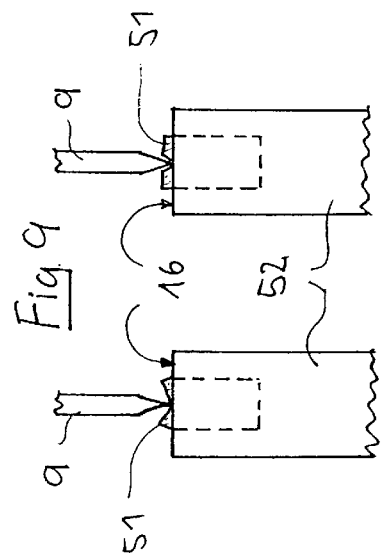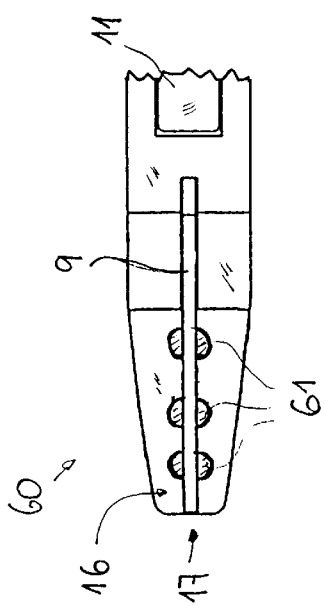

SHEARS, PARTICULARLY HAND-HELD GARDEN OR PRUNING SHEARS OR SECATEURS

BACKGROUND OF THE INVENTION

1. Field of the Invention

Figure 3:
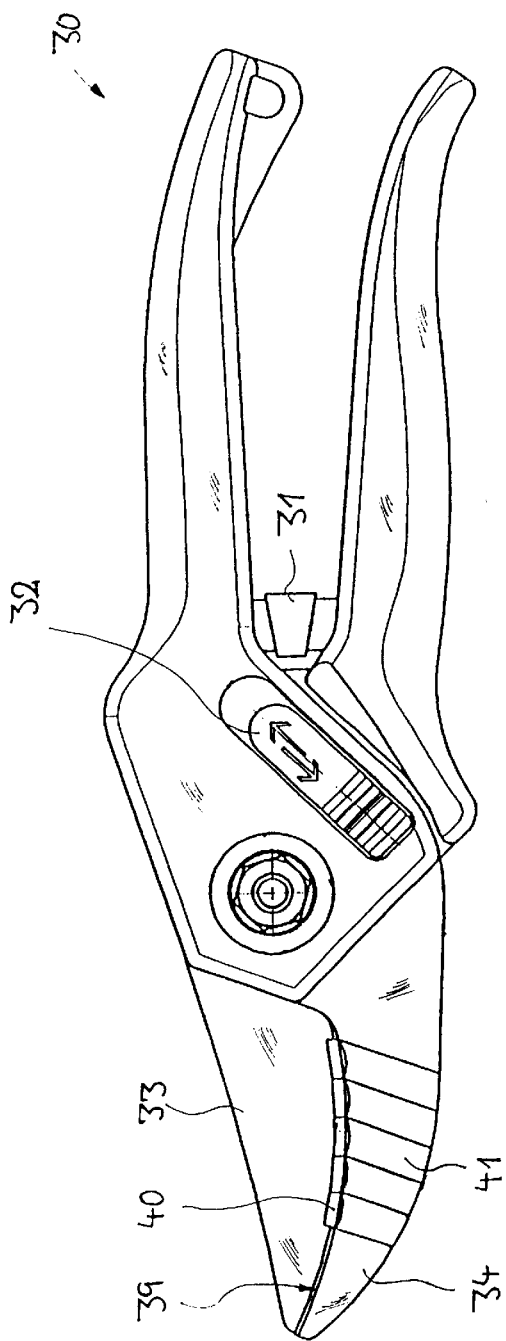

The invention relates to shears, particularly hand-held garden or pruning shears or secateurs.

2. Description of the Prior Art

Such shears have two shear elements pivotable against one another about a pivoting axis and have engagement portions for reciprocal cutting engagement. The engagement portions form or bound in the open state of the shears a shear opening normally continuously widening from the pivoting axis and which is reduced on closing the shears, i.e. on initiating and performing the cutting process. The problem frequently arises with shears of this type that cutting material with a relatively high cutting resistance, e.g. a flower stalk or branch, tends on closing the shears to be forced out of the shear opening or mouth. In order to complete a cut it is then necessary to possibly grasp again several times or a second hand is needed for retaining the cutting material, so as to prevent a forcing of said cutting material out of the shear opening.

SUMMARY OF THE INVENTION

The object of the invention is to obviate these disadvantages of the prior art. In particular, shears are to be provided, which without any change to the otherwise familiar functions make it possible to reliably separate cutting material, such as e.g. flower stalks or branches, in a single, uninterrupted cutting process.

For solving this problem the invention proposes shears comprising two shear elements being pivotable against one another about a pivot axis, the shear elements comprising engaging portions provided for mutual cutting engagement, the shear elements, in an opened state of the shears, forming a shear opening widening from the pivot axis, the shear opening becoming smaller upon closing the shears, the shears further comprising holding means separate from the shear elements, the holding means being adapted such that the holding means apply a holding force for retaining cutting material introduced into the shear opening essentially only until the cutting process is completed. Preferred further developments are given in the dependent claims. By reference, the wording of all the claims is hereby made into part of the content of the description.

Consequently shears according to the invention are characterized in that there are separate holding means essentially only active up to the completion of a cutting process for holding cutting material introduced into the shear opening during the closing of the shears. As a result the cutting material is reliably held in the shear opening during the closing process of the shears, so that the described sliding or forcing out from the shear mouth is avoided or at least largely prevented. Consequently a cut can be completed in a single shear closing process and the cutting material can be completely cut through. However, as soon as the cutting material is cut through, the holding or retaining action of the holding means automatically decreases to such an extent that the cut parts of the cutting material, precisely as in conventional shears, automatically drop or the shears can be moved away from the cutting material without it being necessary to open the shears again beforehand.

Whereas in the case of shears with toothed or serrated cutting edges such a holding action can at least partly be obtained through the teeth of the engagement portions, through the inventive provision of separate holding means, i.e. holding means provided additionally to the shear elements, the action of the invention can be attained with any shear type, particularly also shears with smooth cutting edges, which are preferred for many cutting operations, particularly in the garden sector, as a result of the smooth, unfrayed cut which can be produced.

Due to the fact that the cutting material is released from the shears automatically on completing a cut without having to reopen the shears again, the shears according to the invention differ clearly from other known shears, where separate holding means are provided in order to retain on the shears the cut material after completing the cut for as long as said shears remain closed. An example for such garden shears or secateurs, particularly constructed as rose shears, is disclosed by DE 81 11 164. The crop shears according to DE 43 02 136 is so constructed through holding elements running parallel to the cutting edges that a clamping action is exerted on the separated portions of cutting material after completing the cut and with the shears closed, so that it is possible to prevent the dropping of the cut portion, e.g. when harvesting tree fruit. U.S. Pat. Nos. 1,458,878 and 1,151,874 disclose such shears with holding means making it possible to retain cut through cutting material with the shears closed and to transport same away with the aid of the closed shears. Such shears are essentially based on the holding or retaining function of the shears after the completion of the cut and require a rethink on the part of the user with respect to the handling compared with conventional shears without holding means. However, in the case of the shears according to the invention the holding means are only active essentially during the cutting process, i.e. up to the complete cutting through of the cutting material and then the shears behave in much the same way as shears without holding means, so that a user accustomed to conventional holding means-free shears when using the shears according to the invention does not have to rethink his procedure. However, when using shears according to the invention cutting work can be reliably and rapidly performed, because in each case it is merely necessary to apply the shears in order to initiate and complete the cutting process. A user also regularly has the other hand free, so that he can hold on when working in the crowns of trees, so that as a result of the shears according to the invention working safety is improved.

According to a preferred development the holding means form at least one elastically flexible holding surface and are so constructed and positioned that the not or not completely cut cutting material are surface-pressed onto the holding surface through the closing of the shears or the reduction of the shear opening by means of the shear elements whilst building up friction and after completing the cut and whilst decreasing the contact pressure there can be a release from the holding surface. The elastically flexible holding surface makes it possible to produce a holding force, which increases as the cutting pressure rises and with a corresponding rising tendency to press the cutting material out of the shear opening and correspondingly decreases on reducing the cutting pressure, i.e. after cutting through the cutting material to such an extent that the holding function is eliminated and the cutting material is released. Thus, a slip inhibition at least partly dependent on the cutting pressure is created.

The holding means are preferably formed in that at least one separate, rubber-like holding element is provided, which is fitted in preferably detachable or replaceable manner to one of the shear elements. The holding element can be made essentially of rubber or a rubber-like plastic and/or is constructed in one piece. Such rubber-like fabricated parts are inexpensively manufacturable in any appropriate shape and can form with their outer faces the elastically flexible holding surface.

There are numerous possibilities for fitting such rubber-like holding elements to the shears or a shear element. According to a further development on at least one of the shear elements is formed at least one reception opening for the preferably captive reception of at least one rubber-like holding element. The receptacle can be constructed in integral manner with the body of the shear element, e.g. as a bore or a bore-like opening, in which can be inserted in slightly compressed and consequently largely self-holding manner a rubber-like element. Thus, a holding element can be so spatially integrated into a shear element that it is substantially surrounded by the shear element material and essentially only exposes a portion with the holding surface at an appropriate location. Appropriately the reception opening is oriented in such a way that the holding element can be more firmly pressed into the reception opening by the cutting pressure on cutting and is consequently held in captive manner.

It is also possible to provide at least one fastening device for fastening at least one rubber-like holding element to the shear element, which is separate from the latter and is preferably detachably fastenable thereto. In this case it is merely necessary to provide on the shear element devices, e.g. in the form of tapped holes, which permit a fastening of the fastening device. Together with the shear element, the latter can form a reception opening for the holding element and act in the manner of a clamping device, so as to secure the holding element in captive manner on the shear element.

It is also possible for the holding means to have at least one rubber-like holding element, which can be fitted in self-retaining manner on a shear element, it being in particular attachable or mountable and/or clampable on the shear element. In this case there is no need for separate reception openings and/or separate fastening devices-on the shear element, because the holding element itself acts in the manner of a fastening device.

For protecting the holding elements against overloading during cutting, according to a further development it is possible to place a holding element in an associated reception opening in such a way that a projecting portion of the holding element forming the holding surface projects slightly in the vicinity of a mouth of the reception opening located on the engagement surface of the shear element over said shear element surface. The height of the projecting portion is preferably dimensioned in such a way that, as a result of the cutting pressure, the holding element can be compressed to such an extent that it is surface-flush in the reception opening. This creates a path limitation for compression and therefore protects the holding element against overloading. The holding function of the holding element is retained, because the compressed holding element still presses in the vicinity of the mouth or opening on the cutting material resting on the engagement surface and secures the same.

It also contributes to protecting holding means against damage when, according to a further development, holding means are positioned outside or alongside a preferably elongated cutting area, where a cutting engagement takes place between the shear elements. Thus, no cutting edge of a shear element acts directly on the holding means, so that damage is avoided. However, preferably the holding means are so close, e.g. with a small lateral spacing with respect to the cutting area, that the cutting pressure produced by a cutting edge on the cutting material in the case of a suitable flexural rigidity of the cutting material can be transferred to the area of the holding surface on the holding means.

It may be sufficient to only provide holding means on one side of the cutting area, so that on the opposite side the cutting material is directly supported on a shear element. Such constructions are particularly cost-effective. However, it is also possible to provide holding means on both sides of the cutting area. As an alternative and optionally also additionally to laterally positioned holding means, holding means can also be provided in the cutting area and then with the holding surface simultaneously form a mating surface for a cutting edge of the other shear element. As a function of the shear construction and the desired use, a choice can be made between these possibilities.

In the case of a further development explained in conjunction with the embodiments, the shears are constructed as anvil shears, in that only one shear element as an engaging portion has a preferably smooth cutting edge and on the other shear element, the anvil, is formed a mating surface for the cutting edge which does not itself cut and on which the cutting edge can be pressed for producing a one-sided cutting engagement in the manner of a knife. The normally solid anvil, which is wide compared with normal cutting edges, forms a wide cutting support on which the cutting material is supported during cutting over a certain length at right angles to the cutting area. Preferably the holding means are exclusively located on the shear element constructed as an anvil and which as a result of its width and solid construction offers adequate space for the provision of reception openings for holding elements. The shear element provided with a cutting edge can remain unchanged compared with conventional shears of similar design and construction. With such embodiments the holding means are consequently fitted to only one of the shear elements. However, it is also possible to provide identical or different holding means, which can appropriately cooperate, on both shear elements.

It is also possible to construct the shears as doubled edged shears, in which each shear element as an engaging portion has a cutting edge or blade, the engaging portions sliding past one another in scissor-like manner during cutting. In particular, double edged shears can be constructed with a narrow upper blade and a lower blade with a wide, only slightly bevelled blade edge, which is generally constructed in a more solid manner than the upper blade in the cutting edge area. It is here once again possible to use the more solid shear element, namely the lower blade, for fitting holding means.

These and further features can be gathered from the claims, description and drawings and the individual features, both singly and in the form of subcombinations, can be implemented in an embodiment of the invention and in other fields and can represent advantageous constructions.

The invention is described in greater detail hereinafter relative to the attached drawings, wherein show:

FIG. 1 A side view of a preferred embodiment of anvil shears provided with holding means according to the invention, in which the holding means are positioned laterally alongside the cutting area.

FIG. 2 A plan view of the anvil shears of FIG. 1.

FIG. 3 A side view of double-edged shears equipped with holding means according to the invention.

Figure 4:
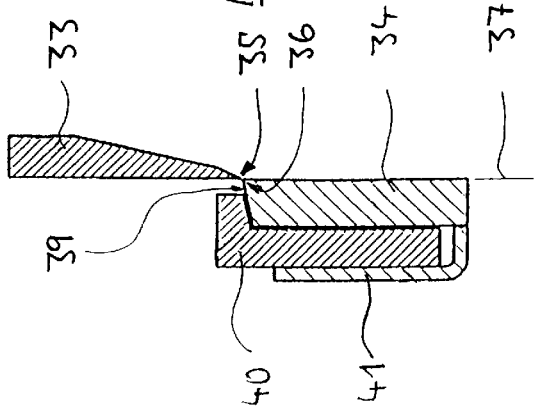

FIG. 4 A diagrammatic vertical section through the shear elements of double edged shears with holding means fitted to the lower blade.

Figure 5:
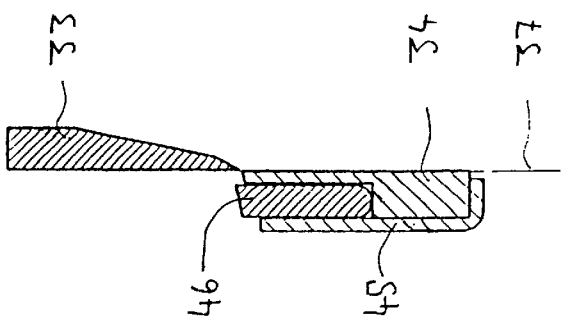

FIG. 5 A diagrammatic vertical section through another embodiment of double edged shears with holding means on the lower blade positioned laterally alongside the cutting area.

FIG. 6 A side view (top) and a plan view (bottom) of another embodiment of anvil shears, where the holding means are positioned centrally on the anvil surface in the cutting area.

FIG. 7 An embodiment with holding means arranged centrally with the anvil surface and which essentially take up the entire anvil length.

FIG. 8 An embodiment with several holding means located in the cutting area.

FIG. 9 A diagrammatic vertical section through an embodiment of anvil shears with holding means located in the cutting area.

The side view of FIG. 1 shows shears 1 constructed as anvil shears and which can be used as hand-held garden or pruning shears or secateurs in the home and garden sector, e.g. for cutting mainly plant material, such as flower stalks, branches, etc. The shears have two rigid shear arms 2, 3, which are movably interconnected in the vicinity of a pivot or swivel joint 4 and are pivotable against one another about a pivot axis or pin 5 in a plane parallel to the paper plane. Each of the shear arms crossing in the vicinity of the pivot joint has an operating or actuating section 6, 7 visible to the right in the drawing and serving as a handle and on the other side of the pivot joint a shear element 8, 9, which is rigid and optionally connected in one piece to the particular actuating or operating section. By means of a helical compression spring 10 positioned between the operating sections, the shears are pretensioned in an open position of the shear arms or elements and can be locked by not shown locking means in the closed position shown, the locking action being activatable or releasable by operating a control button 11 located on the top of the shear arm 2.

The steel shear element 9 coupled to the lower handle section 7 and at the top in the drawing is constructed in the manner of a substantially triangular knife, on whose narrow side facing the other shear element 8 is constructed a sharp-edged, straight blade or cutting edge 15.

The opposite or facing shear element 8 is much wider and more solid than the shear element 9 and has a top surface 16 appearing trapezoidal in plan view (FIG. 2) facing the blade 15 and which can also be referred to as an anvil surface. The anvil surface tapering towards the front end of the shears and the blade 15 centrally striking the anvil surface form the engaging portions which on using the shears act on the cutting material and cooperate in a cutting area 17 positioned centrally with respect to the anvil 8 for producing a cutting engagement. The cutting edge or blade 15 then makes a cut in the cutting material introduced at right angles to the longitudinal direction of the shear element 9, whereas the anvil surface serves as a support for the cutting material and as the itself non-cutting mating element for the edge of the shear element 9.

When the shears are open, the engaging portions 15, 16 form a roughly triangular shear opening or mouth, which widens in wedge-like manner from the pivot joint 4 up to the front end of the shears remote from the handles 2, 3 and which on closing the shears decreases, whilst reducing the widening angle up to mutual contact between the engaging portions 15, 16. In the case of conventional shears of this type the problem then arises that a branch or the like inserted with the shears open between the cutting edge 15 and the anvil surface 16 as a result of the wedge action of the shear elements can be forced out of the shear mouth opening before a complete cutting through has occurred. This can frequently not be completely counteracted by the anvil surface 16, as in the embodiment shown, being structured by transverse grooving and consequently a certain retaining action against sliding out is exerted on the pressed cutting material.

To obviate this problem, in the case of the shears 1 there are separate holding means for holding cutting material introduced into the shear opening during the closing of the shears or during the cutting process. The holding means provided exclusively on the anvil 8 incorporate as an essential element a rubber-like holding element 21, which in the present embodiment can be constructed as a one-piece, rubber-like plastic part made from an injection moulded, thermoplastic elastomer. It can also be made from other materials with comparable elastic characteristics, e.g. from rubber, and is referred to in simplified manner as a rubber body or cushion 21. The rubber body 21 is inserted in a shape-adapted reception opening 22 of the anvil shear element 8, the dimensioning of the rubber body being adapted to that of the reception opening in such a way that the elastic element 22 is located in slightly compressed form in the reception opening and is consequently secured in self-retaining manner against dropping out. As is shown in the plan view of FIG. 2, the rubber body is shaped like three circular cylinders juxtaposed in a row and which are interconnected by thinner neck or waist portions. The reception opening is correspondingly shaped like three axially parallel cylinder bores, which pass into one another, accompanied by the formation of tapering portions. The three circular channels of the reception opening 22 pass essentially perpendicular to the anvil surface 16 to a depth of a few millimeters. The dimensions of the rubber body 21 are so adapted to those of the reception opening that the rubber body projects with a projecting portion 23 of e.g. a 0.5 mm height over the anvil surface 16. The surface of the rubber body 21 exposed above the reception opening forms an elastically flexible holding surface 24 of the holding means.

Below the holding means is provided a decoration 25 on the outside of the anvil 8 visible in FIG. 1 and which is in the form of three round beads or rolls bevelled in the direction of the pivot joint 4 and which correspond with the shape of the rubber body and reception opening. The decoration 25 makes it possible to more easily distinguish anvil shears with holding means according to the invention from corresponding shears without such holding means.

As can be seen in FIG. 2, the reception opening 22 or the rubber body 21 received therein is not located in the cutting area 17, i.e. the narrow cut zone between the plane passing through the upper blade 9 and the anvil surface 16 and is instead positioned in laterally displaced manner alongside the cutting area and essentially still within the anvil surface 16. This ensures the necessary retaining or holding action without the rubber body being contacted by the cutting edge 15 and optionally precut by it. It is possible to provide cutting means of the indicated or an identical or similar acting type on either side of the cutting area 25 and optionally symmetrically thereto.

If now with the shears open a branch, flower stalk, etc. is introduced into the shear opening and the shears are slowly closed for cutting through the cutting material, the latter on closing the shears presses into the rubber body 21 up to the anvil surface 16, so that the rubber body is compressed n path-limited manner. The rubber body is compressed until the holding surface 24 is zonally substantially flush with the anvil surface 16. A further compression of the rubber element, which might destroy the same is avoided. Through the compression of the rubber body a friction grip is produced between the latter and the cutting material and the latter is secured by it against sliding out of the shear mouth for as long as cutting pressure exerted by the cutting edge 15 acts on the cutting material. However, as soon as the cutting process is ended and the cutting material has been completely cut through, this contact pressure collapses and, without prior opening of the shears, the cutting material is released by the latter.

Specifically in the case of anvil shears, such rubber cushions are not only very advantageous as a result of this described holding action. It has in fact namely been found that when using anvil shears, e.g. for cutting the branches of a tree, due to the contact pressure between the wide anvil and the cutting material located in this area pressure points can arise on said material, which with respect to the branch portion left behind on the tree can sometimes be susceptible to fungal attacks, because they represent a damage to the bark of the tree. When using anvil shears according to the invention such problems can be avoided, because the rubber-like holding means simultaneously provide a cushioning effect for the living cutting material pressed in this area towards the anvil. Due to the fact that during the cuffing process the bearing surface between the holding means 21 and the cutting material is increased, the pressure acting on the cutting material in local manner on the anvil side is reduced to such an extent that the described bark damage is avoided. Thus, appropriately anvil shears with an only one-sided rubber cushion, as in the embodiment shown, is used in such a way that the cutting area side provided with the rubber cushion or padding is directed towards the tree or the branch portion remaining on the tree.

The rubber body shape can vary according to the nature and dimensioning of the shears or shear elements. A structuring in the longitudinal direction of the cutting edge, as results from the double tapering of the rubber body 21, is usually favourable, because then a displacement of the entire rubber body as a result of its compression in the receptacle in the direction of the open end of the shear mouth can be counteracted. The double taper leads to a positive securing of the rubber body against axial displacement in the reception opening in the mouth opening direction. It is also possible, in place of the one-piece, multiply necked-down rubber cushion shown, to provide several individual bodies and correspondingly several reception openings are provided on the anvil (cf. FIG. 8). The cross-sectional shape of the rubber body can also be chosen according to esthetic standpoints, provided that the described holding or retaining action is adequately maintained. It is also possible to additionally embed one or more rubber-like holding elements in the cutting area 17 of the anvil shear element, so that the cutting edge 15 can at least zonally press on a holding element.

FIG. 3 shows that also double edged shears can have an improved function as a result of the holding means according to the invention. The construction of the doubled edged shears 30 shown is similar to that of the anvil shears 1 already described, but the handle portions of the shear elements are somewhat differently shaped, in place of the helical compression spring 10 there is a pruning shear spring 31 and in place of the button 11 there is a lateral slide 32 for locking or unlocking the shears. Significant differences arise in the structure and function of the shear elements 33, 34. As can in particular be seen in FIGS. 4 and 5, double edged shears of this type have a narrow upper blade 33 with an acute-angled bounded cutting edge 35 and a more solid lower blade 34 with an only slightly bevelled blade edge 36. During the cutting process the cutting edges of the upper and lower blades slide on one another in the vicinity of a shearing plane and cut through the cutting material with a typical shearing cut.

Although in the case of an adequately wide lower blade it is also possible with this shear type to embed in the shear element 34 one or more rubber-like holding elements in corresponding reception openings in such a way that they project over the top 39 of the lower blade, here a possibility of fastening the holding elements particularly advantageous for narrow lower blades is implemented. In the variant shown in FIG. 4 there is a L-shaped rubber element 40 in the cross-section shown and which extends in the longitudinal direction of the shears or shear element over a length of e.g. 1 to 3 centimeters and by means of a fastening element 41 screwable to the lower blade 34 can be fastened to the latter in such a way that the short leg of the rubber cushion extends close to the cutting plane 37 over and beyond the lower blade top surface 40. During the cutting process the cutting material to be cut is pressed onto the short leg of the rubber cushion 40 and is held by it until completely cut through. Also in the case of anvil shears such a separate, lateral retaining support can be provided and the rubber element can project laterally on the anvil surface.

For holding a rubber body 46 to the lower blade, in the embodiment of FIG. 5 there is also an angular fastening element 45 which can be fitted to and detached from the lower blade 34, e.g. by screwing. However, here on its outside remote from the cutting plane the lower blade has an outwardly open rectangular recess for the rubber body, which is inserted in accurately fitting manner in the recess and is secured therein by the subsequently screwed down fastening element. Also in this embodiment a portion of the rubber body 46 projects over the top surface 47 of the lower blade. Much as in the embodiment according to FIGS. 1 and 2, during the cutting process the rubber body can be pressed into the reception opening formed between the fastening element 45 and lower blade 34 to such an extent that the cutting material rests on the upper edge of the blade or the lower blade top 47 and consequently no further compression of the rubber body is possible.

Hereinafter various anvil shear embodiments are explained relative to FIGS. 6 to 9 and in these holding means in the form of one or more rubber-like holding elements are so embedded in the cutting area of the anvil shear element that the cutting edge of the other shear element presses at least zonally on the holding surface of the holding element and can optionally cut into the same. With the exception of the devices on the anvil provided for the fitting of the holding elements, the anvil shears can have the same construction as in FIG. 1. Thus, to facilitate understanding corresponding components are given the same reference numerals.

Also in the case of the anvil garden shears or secateurs 50 of FIG. 6, there is a single, double-necked-down rubber cushion 51 integrated into the anvil 52 in such a way that its substantially planar holding surface 53 projects by a small amount over the anvil surface 16 facing the cutting edge 15. It can be gathered from the plan view in FIG. 6 (bottom), that in this embodiment the rubber cushion 51 is located directly below the cutting edge 15 or centrally in the cutting area 17. In this embodiment the holding element only takes up part of the anvil length parallel to the cutting edge direction. As a result, in the closed state of the shears shown the cutting edge 15 with its joint-nearest and its joint-remotest portion at the front end of the shears rests directly on the anvil surface, whilst between the same meeting the rubber cushion 51, whose width is dimensioned in such a way that it extends on both sides of the cutting area over a width roughly corresponding to the width of the back of the upper shear element 9. In an anvil shear embodiment 55 shown in FIG. 7, the holding element 56 embedded in the centre of the anvil and in the longitudinal direction thereof extends substantially over the entire anvil length up to the front end 57 thereof. Corresponding to the greater rubber body length, in the longitudinal direction thereof there are four tapers, which in the correspondingly shaped reception opening 58 bring about a positive retention in the longitudinal direction of the rubber body. A further embodiment shown in plan view in FIG. 8 provides for a subdivision of the rubber cushion into several individual elements, so that here the holding means 61 are in the form of several individual bodies spaced from one another in the longitudinal direction of the shears and which are in each case centrally placed in corresponding shape-adapted reception openings in the cutting area of the shears, i.e. below the upper shear element 9.

With such arrangements with one or more rubber-like holding elements or cushions located below the cutting edge 15, the latter of the upper shear element 9 can press downwards the central area of the rubber cushion when the shears are in the closed state, as shown to the left in FIG. 9. On either side of the shears, holding element portions still project upwards over the anvil surface 16. After prolonged use of the shears a state can arise in which the rubber cushion located in the cutting area is indented in the cutting edge impact area and the cutting edge of the sharp blade engages in a slit in the rubber cushion (to the right in FIG. 9). For the function of the rubber cushion, particularly for the holding and padding function, this cushion damage in the vicinity of the holding surface is unimportant, because the holding function provided in the phase prior to the complete cutting through of the cutting material is not impaired by it. At the start of the cut the cutting material is located between the lower cutting edge of the upper shear element and the rubber cushion surface projecting over the anvil surface. In the case of pressure of the cutting edge and the penetration thereof in the cutting material, the cutting material presses the rubber cushion into its receptacle in the anvil and is consequently mainly supported on the firm lateral parts of the anvil surface on either side alongside the reception opening for the rubber cushion. After cutting through the cutting material the rubber cushion then reassumes the relaxed shape, in which the holding surface is located slightly, e.g. 1 to 2 mm above the anvil surface.

It is common to all the embodiments that the cutting material to be cut is only retained by the rubber-like holding means as a result of the contact pressure and prevented from sliding out of the shear opening, for as long as the cutting material has not been cut through. Thus, the cutting material drops from the shears as soon as cutting is ended, without a user having to open the shears for this purpose. Thus, the holding means according to the invention create an improvement with respect to the undesired sliding of cutting material out of shear openings, without any disadvantageous influence on the characteristics normally encountered with such shears.

What is claimed is:

1. Shears comprising two shear elements pivotable against one another about a pivot axis, the shear elements comprising:

engaging portions provided for mutual cutting engagement, the shear elements, in an opened state of the shears, forming a shear opening widening from the pivot axis the shear opening becoming smaller upon closing the shears;

holding means separate from the shear elements, the holding means adapted such that the holding means apply a holding force for retaining cutting material introduced into the shear opening essentially only until the cutting process is completed, wherein the holding means comprise elastically compressible material and form at least one elastically flexible holding surface for holding cutting material, the holding means constructed and arranged such that cutting material being one of not yet and not yet completely cut is pressed by the closing action of the shears onto the holding surface accompanied by building up a frictional holding force onto an area of the holding surface for holding the cutting material, and wherein after completion of the cutting through the cutting material the frictional holding force acting on the cutting material is reduced and the cutting material is released from the holding surface.

2. Shears comprising two shear elements pivotable against one another about a pivot axis, the shear elements comprising:

engaging portions provided for mutual cutting engagement, the shear elements, in an opened state of the shears, forming a shear opening widening from the pivot axis, the shear opening becoming smaller upon closing the shears;

holding means separate from the shear elements, the holding means adapted such that the holding means apply a holding force for retaining cutting material introduced into the shear opening essentially only until the cutting process is completed, wherein the holding means comprise at least one rubber-like holding element being fitted to one of the shear elements.

3. Shears according to claim 2, wherein at least one of the rubber-like holding elements is at least one of detachable from the associated shear element and substantially made from a rubber-like plastic material and essentially made of rubber and being constructed as a one piece element.

4. Shears comprising two shear elements pivotable against one another about a pivot axis, the shear elements comprising:

engaging portions provided for mutual cutting engagement, the shear elements, in an opened state of the shears, forming a shear opening widening from the pivot axis, the shear opening becoming smaller upon closing the shears;

holding means separate from the shear elements, the holding means adapted such that the holding means apply a holding force for retaining cutting material introduced into the shear opening essentially only until the cutting process is completed, wherein at least one of the shear elements comprises at least one reception opening for receiving at least one rubber-like holding element.

5. Shears comprising two shear elements pivotable against one another about a pivot axis, the shear elements comprising:

engaging portions provided for mutual cutting engagement, the shear elements, in an opened state of the shears, forming a shear opening widening from the pivot axis, the shear opening becoming smaller upon closing the shears;

holding means separate from the shear elements, the holding means adapted such that the holding means apply a holding force for retaining cutting material introduced into the shear opening essentially only until the cutting process is completed, wherein at least one separate fastening device is associated with at least one of the shear elements, the at least one separate fastening device being detachably fastenable to the shear element and being adapted for fastening at least one rubber-like holding element to the shear element, wherein the fastening device and the associated shear element are adapted such that the fastening device and the shear element form a reception opening for at least one holding element.

6. Shears according to claim 5, wherein the fastening device is constructed as a clamping device for applying a clamping force to the holding element when fastened to the associated shear element.

7. Shears comprising two shear elements pivotable against one another about a pivot axis, the shear elements comprising:

engaging onions provided for mutual cutting engagement, the shear elements, in an opened state of the shears, forming a shear opening widening from the pivot axis, the shear opening becoming smaller upon closing the shears;

holding means separate from the shear elements, the holding means adapted such that the holding means apply a holding force for retaining cutting material introduced into the shear opening essentially only until the cutting process is completed, wherein the holding means comprise at least one holding element and wherein the holding element is positionable in an associated reception opening of a shear element such that a projecting portion of the holding element forming an elastically flexible holding surface in the vicinity of a mouth of the reception opening located on an engagement surface of the shear element projects slightly beyond the engagement surface of the shear element.

8. Shears comprising two shear elements pivotable against one another about a pivot axis, the shear elements comprising:

engaging portions provided for mutual cutting engagement, the shear elements, in an opened state of the shears, forming a shear opening widening from the pivot axis, the shear opening becoming smaller upon closing the shears;

holding means separate from the shear elements, the holding means adapted such that the holding means apply a holding force for retaining cutting materiel introduced into the shear opening essentially only until the cutting process is completed, wherein at least one of the shear elements comprises at least one reception opening for receiving at least one rubber-like holding element and wherein the reception opening is constructed as an opening integral with a body of a shear element.

9. Shears comprising two shear elements pivotable against one another about a pivot axis, the shear elements comprising:

engaging portions provided for mutual cutting engagement, the shear elements, in an opened state of the shears, forming a shear opening widening from the pivot axis, the shear opening becoming smaller upon closing the shears; and, elastically flexible holding means separate from the shear elements, the holding means being adapted such that the holding means apply a holding force for retaining cutting material introduced into the shear opening essentially only until the cutting process is completed.

10. Shears according to claim 9, wherein at least one of the shear elements comprises at least one reception opening formed integral with a body of the shear element, and wherein the holding means is constructed as separate rubber-like holding elements adapted to fit into the reception opening.

* * * * *